(12) United States Patent
Jiang et al.

(10) Patent No.: US 8,825,567 B2
(45) Date of Patent: Sep. 2, 2014

(54) FAULT PREDICTION OF MONITORED ASSETS

(75) Inventors: Xiaomo Jiang, Atlanta, GA (US); Eric Gebhardt, Roswell, GA (US); Michael Bernard, Greenville, SC (US); Steven Hartman, Marietta, GA (US)

(73) Assignee: General Electric Company, Schenectady, NY (US)

( * ) Notice: Subject to any disclaimer, the term of this patent is extended or adjusted under 35 U.S.C. 154(b) by 212 days.

(21) Appl. No.: 13/368,721

(22) Filed: Feb. 8, 2012

(65) Prior Publication Data

US 2013/0204808 A1    Aug. 8, 2013

(51) Int. Cl.
*G06N 5/02* (2006.01)
*G06N 5/04* (2006.01)
*G06F 11/00* (2006.01)
*G06N 99/00* (2010.01)

(52) U.S. Cl.
CPC *G06N 5/046* (2013.01); *G06N 5/02* (2013.01); *G06F 11/008* (2013.01); *G06N 99/005* (2013.01)
USPC .............................................. 706/12; 706/45

(58) Field of Classification Search
USPC ...................................................... 706/12, 45
See application file for complete search history.

(56) References Cited

PUBLICATIONS

Jabbari, et al., Application of Computational Intelligence for Sensor Fault Detection and Isolation, Proceedings of World Academy of Science, Engineering and Technology, vol. 22, Jul. 22, 2007, pp. 503-508.*

Jayaswal, et al., Machine Fault Signature Analysis, International Journal of Rotating Machinery, vol. 2008, Article ID 583982, 2008, pp. 1-11.*

* cited by examiner

*Primary Examiner* — Wilbert L Starks
(74) *Attorney, Agent, or Firm* — Sutherland Asbill & Brennan LLP

(57) ABSTRACT

Systems and methods for fault prediction are described to reduce equipment failure by effectively monitoring equipment, removing anomalous data, and reducing false alarms. Such systems and methods can be used to receive monitoring data, extract information from the data, and combine extracted information for establishing prediction models. Additionally, fault probabilities may be quantified and faults may be predicted based on the probabilities.

20 Claims, 4 Drawing Sheets

FAULT PREDICTION OF MONITORED ASSETS

TECHNICAL FIELD

Embodiments of the invention relate generally to fault prediction and more particularly to the analysis of monitored asset data to predict faults in the assets.

BACKGROUND OF THE INVENTION

Unplanned outages due to equipment failures can be disruptive and costly. Despite the availability of equipment performance data and rules implemented by existing monitoring and diagnostic (M&D) services, many of the outages are not detected before they occur. A primary reason for the failure to detect the outages is inefficient data analysis techniques. Such techniques or rules, for example, may fail to reduce the number of false alarms of equipment failures, thereby reducing the reliability and usability of existing prediction methods.

BRIEF DESCRIPTION OF THE INVENTION

Some or all of the above needs and/or problems may be addressed by certain embodiments of the invention. Certain embodiments may include systems and methods for predicting faults of monitored assets. According to one embodiment, there is disclosed a system including a memory that stores computer-executable instructions and a processor. The processor is configured to execute the computer-executable instructions in the memory to: receive, from a sensor of an asset, on-site monitoring (OSM) data; extract information from the OSM data; combine extracted information of a first sensor with extracted information of at least a second sensor; and predict a fault in the asset based at least in part on the combined information.

According to another embodiment, there is disclosed a method for receiving, from a sensor of an asset, OSM data; extracting information from the OSM data; combining extracted information of a first sensor with extracted information of at least a second sensor; and predicting a fault in the asset based at least in part on the combined information.

According to a further embodiment, there is disclosed one or more computer-readable media storing computer-executable instructions that, when executed by at least one processor, configure the at least one processor to perform operations for receiving, from a sensor of an asset, OSM data; performing at least one of data validation, outlier analysis, data filtration, data imputation, or statistical distribution analysis on the OSM data; extracting information from the OSM data; combining extracted information of a first sensor with extracted information of at least a second sensor; establishing a prediction model based at least in part on the combined information; quantifying a probability of a fault of the asset; and predicting the fault in the asset based at least in part on the quantified probability of fault.

Other embodiments, systems, methods, aspects, and features of the invention will become apparent to those skilled in the art from the following detailed description, the accompanying drawings, and the appended claims.

BRIEF DESCRIPTION OF THE FIGURES

The detailed description is set forth with reference to the accompanying drawings, which are not necessarily drawn to scale. The use of the same reference numbers in different figures indicates similar or identical items.

DETAILED DESCRIPTION OF THE INVENTION

Figure 1:
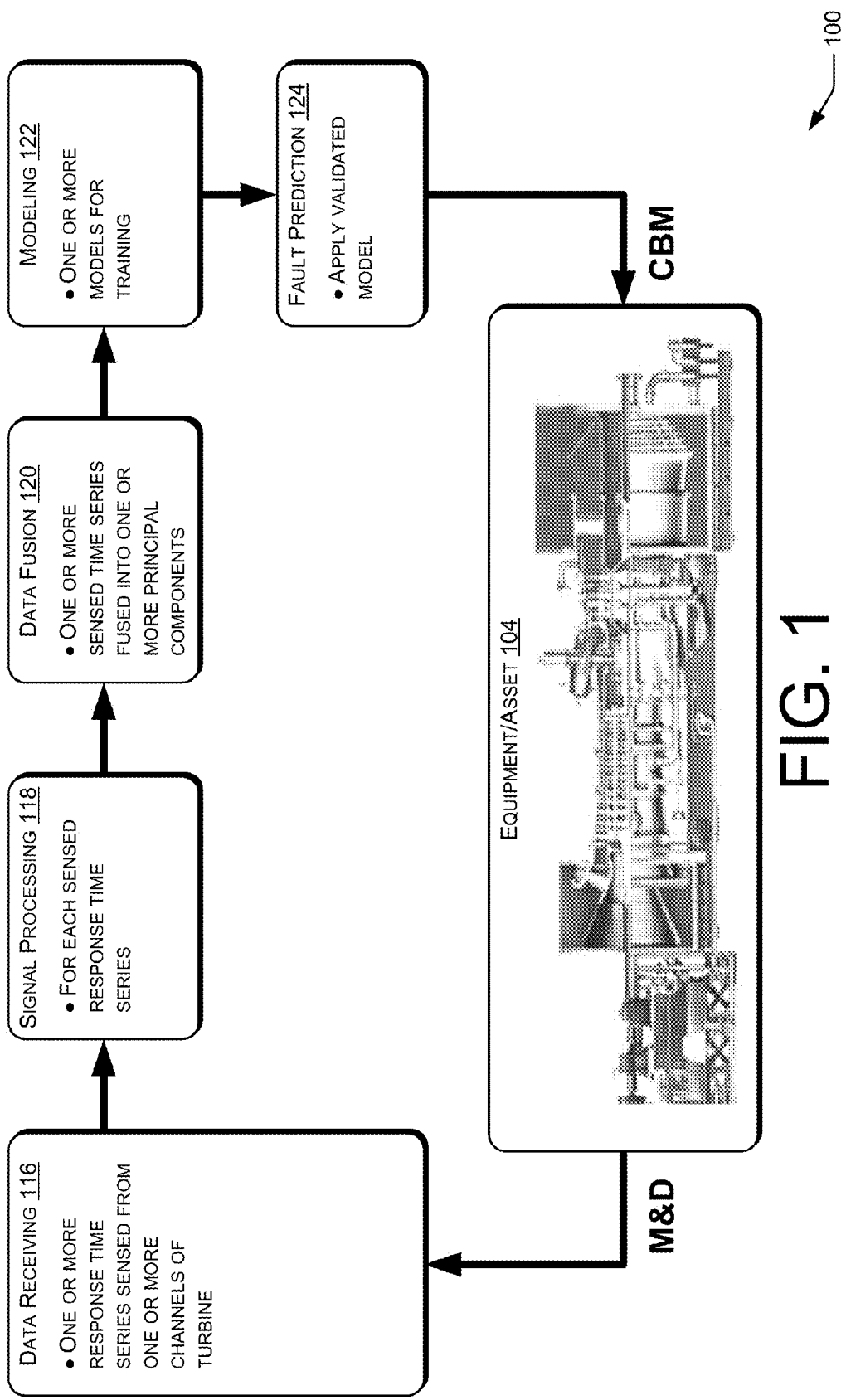
FIG. 1 is a block diagram of an illustrative system for fault prediction in a turbine, according to one embodiment.

Illustrative embodiments will now be described more fully hereinafter with reference to the accompanying drawings, in which some, but not all embodiments of the invention are shown. The invention may be embodied in many different forms and should not be construed as limited to the embodiments set forth herein; rather, these embodiments are provided so that this disclosure will satisfy applicable legal requirements.

Illustrative embodiments of the invention are directed to, among other things, fault prediction. As used herein, fault prediction refers generally to the prediction of failures in assets. Assets as used herein refer generally to equipment that may include one or more units to, for example, operate the equipment. One or more sensors may be associated with each unit or piece of hardware to collect various information regarding the operational performance history or health of the unit and ultimately the asset. Examples of assets can include, but are not limited to, turbines, compressors, and other energy-related equipment, as well as non-energy-related equipment. Such assets may be monitored by analyzing the data collected by the sensors in the assets.

Certain embodiments herein can relate to predicting faults in assets by applying one or a combination of various analytical and statistical techniques to sensor data associated with assets. Such application of techniques can operate on the data so that it can be used to more accurately predict faults and update fault prediction models in adaptive fashion, i.e., as new sensor data is collected. Exemplary methods of the invention can include preprocessing the sensor data to, for example, remove outliers or other unwanted data that may distort fault prediction results. Signal processing may also be performed on sensor data to further remove noise, for example, so that principal information can be extracted from the sensor data.

Various statistical techniques can be used to combine the extracted data into principal components that represent the combined data. The principal components may be analyzed by one or more prediction models to determine the operational performance or health of units in an asset. The probability of a fault occurring in an asset can be quantified to a statistical degree of certainty or confidence that the fault may occur or is imminent. Based at least in part on the prediction models and the quantified probability of fault, a fault in an asset can be predicted. Various fault-related information can be reported, such as the asset in which a fault is probable, the fault's location (e.g., unit or hardware), the probability that the fault will occur, and the amount of time remaining before the probable fault. Certain embodiments herein can relate to the automated prediction of faults in assets.

The technical effects of certain embodiments disclosed herein may include the prolonged life of assets, improved contractual service productivity for parts procurement, and residual life estimation, which can facilitate cost-effective condition-based maintenance (CBM).

FIG. 1 depicts a block diagram of an illustrative system 100 for fault prediction. In one embodiment, the system 100 can predict a fault for a turbine 104. The system 100 may include various processes to predict the fault. The processes may include data receiving 116 in which one or more time series sensed from one or more channels of the turbine 104 is collected. Data collected by sensors associated with the turbine 104 may be represented in the form of time series for each channel or unit. The system 100 may also include digital signal processing 118 in which principal information is extracted from the time series. In one embodiment, noise and other unwanted data is removed from the time series signal to obtain the extracted principal information. The system 100 may further include data fusion 120 in which the extracted information is combined into a representation of the extracted information for each unit of an asset such as the turbine 104. The system 100 may further include modeling 122 in which one or more models for predicted faults can be determined and quantified, and fault prediction 124 in which the determined model can be applied to predict faults. Each of these processes will be explained in greater detail in the following paragraphs.

Although FIG. 1 depicts a turbine, various other energy and non-energy assets may be applicable to certain embodiments herein. Generally, any asset from which data that represents the performance or health of the asset may be collected can be used to predict faults by certain embodiments herein.

Figure 2:
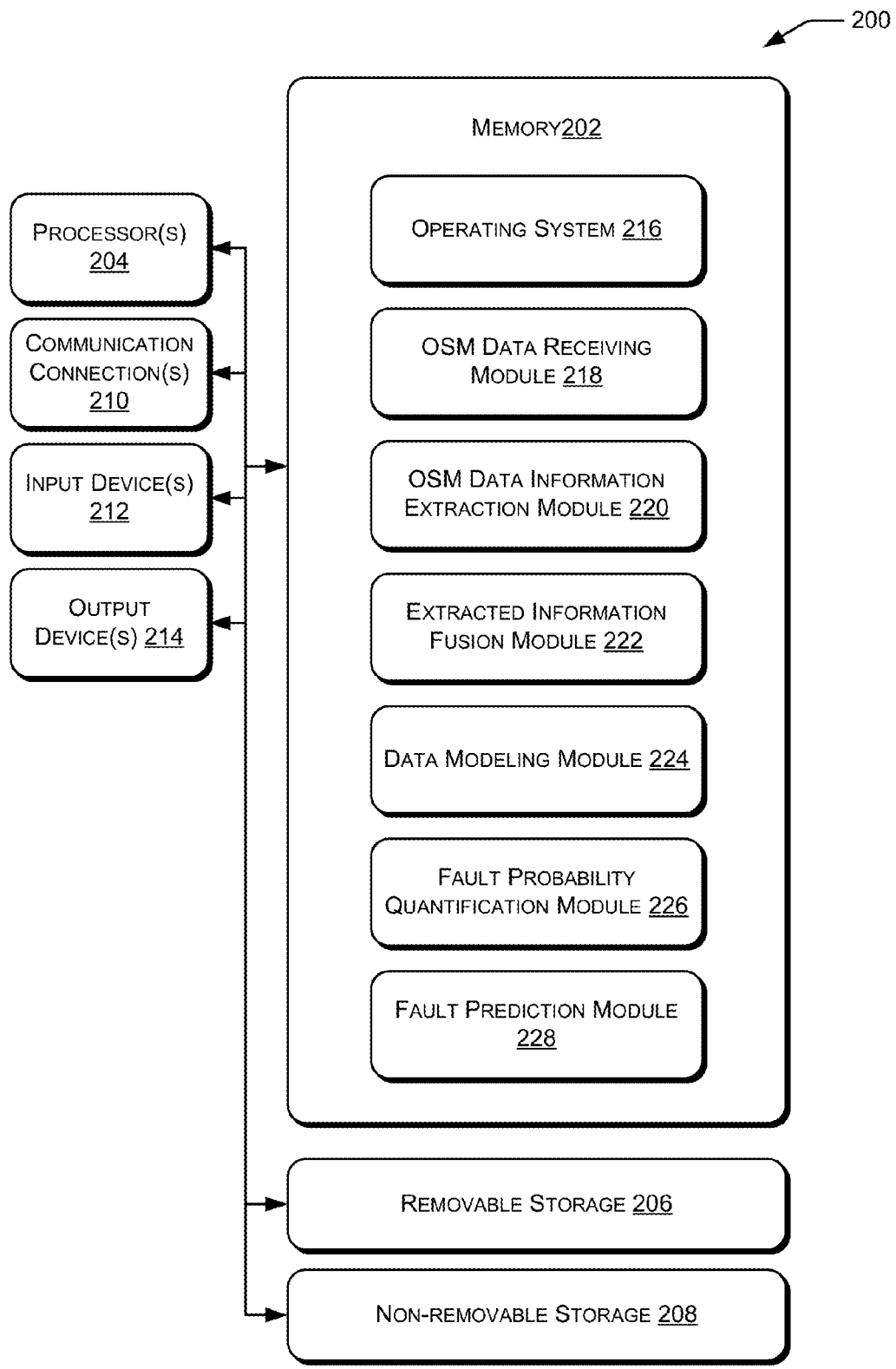
FIG. 2 is a block diagram of a computing environment showing an illustrative system in which fault prediction can be implemented, according to one embodiment.

FIG. 2 depicts a block diagram of an exemplary computing environment in which fault prediction can be implemented. The computing environment 200 can include a computing device which can include a processor 204 capable of communicating with a memory 202. The processor 204 may be implemented as appropriate in hardware, software, firmware, or combinations thereof. Software or firmware implementations of the processor 204 may include computer-executable or machine-executable instructions written in any suitable programming language to perform the various functions described. Examples of computing devices may include a personal computer, mainframe, web server, mobile device, or any processor-based device capable of executing instructions to perform the functions described in embodiments herein.

A memory 202 may store program instructions that are loadable and executable on the processor 204, as well as data generated during the execution of these programs. Depending on the configuration and type of computing environment 200, a memory 202 may be volatile (such as random access memory (RAM)) and/or non-volatile (such as read-only memory (ROM), flash memory, etc.). The computer device may also include additional removable storage 206 and/or non-removable storage 208 including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 202 may include multiple different types of memory, such as static random access memory (SRAM), dynamic random access memory (DRAM), or ROM.

The memory 202, removable storage 206, and non-removable storage 208 are all examples of computer-readable storage media. For example, computer-readable storage media may include volatile and non-volatile, removable and non-removable media implemented in any method or technology for storage of information such as computer-readable instructions, data structures, program modules or other data. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the computer device. Combinations of any of the above should also be included within the scope of computer-readable media.

In other embodiments, however, computer-readable communication media may include computer-readable instructions, program modules, or other data transmitted within a data signal, such as a carrier wave, or other transmission. As used herein, however, computer-readable storage media does not include computer-readable communication media.

The computing environment 200 may also contain one or more communication connections 210 that allow the computer device to communicate with assets capable of communicating with a computing device. For example, the computing device may communicate with sensors that monitor various units in an asset. The connections 210 may be established via a wired and/or wireless connection between a computer device and an asset. The connection may involve a network such as the Internet or may be a direct connection (i.e., excluding a network) between the computer device and the equipment, according to various embodiments. The computing environment 200 may also include one or more input devices 212, such as a keyboard, mouse, pen, voice input device, and touch input device. It may also include one or more output devices 214, such as a display, printer, and speakers.

Turning to the contents of the memory 202 in more detail, the memory 202 can include an operating system 216 and one or more application programs or services for implementing the features and aspects disclosed herein, including an OSM data receiving module 218, an OSM data information extraction module 220, an extracted information fusion module 222, data modeling module 224, fault probability quantification module 226, and fault prediction module 228.

Figure 3:
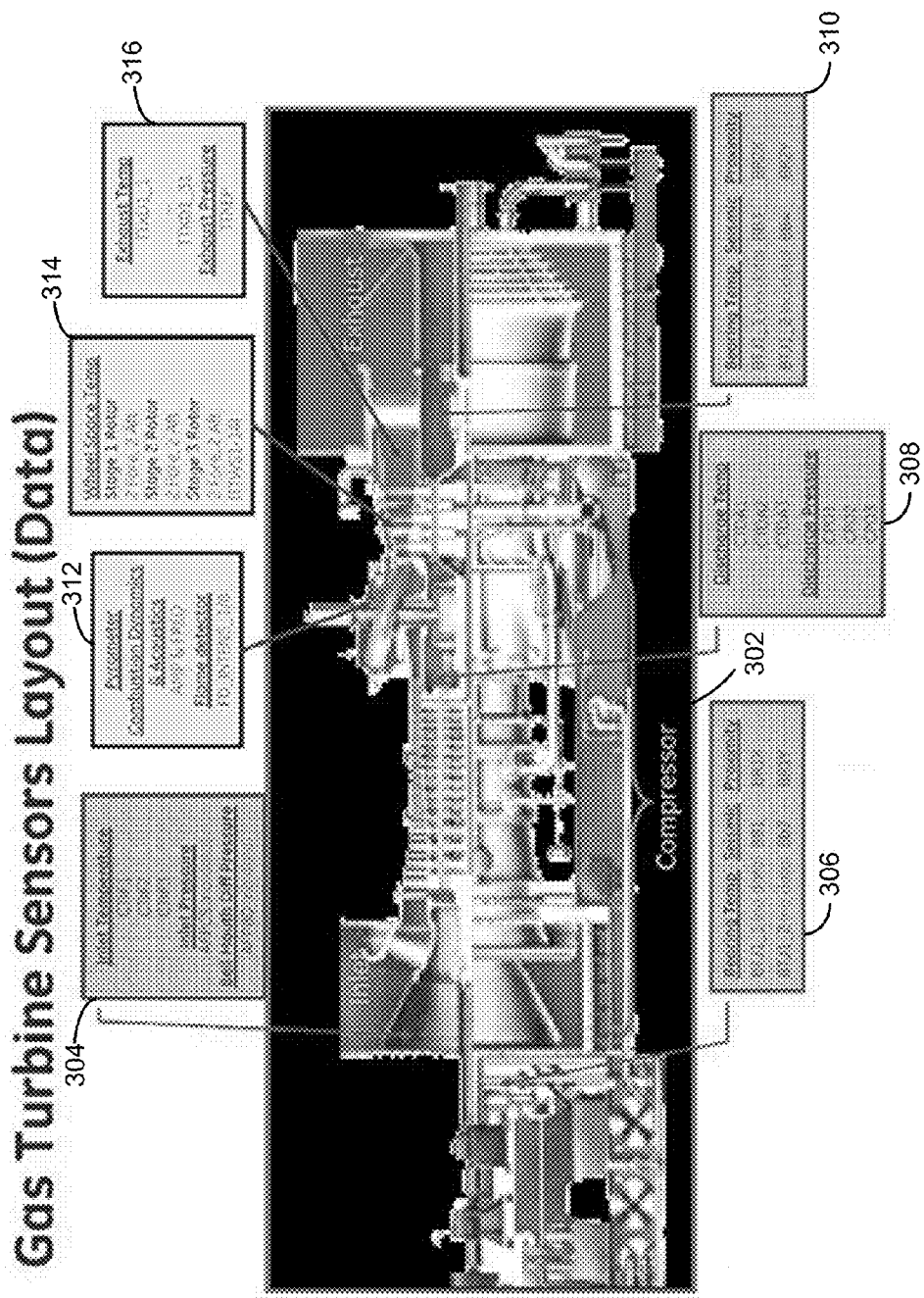
FIG. 3 is a block diagram of a compressor and associated data that can be used to predict faults in the compressor, according to one embodiment.

The OSM data receiving module 218 can receive data from one or more sensors associated with units in an asset. As noted above, the sensors can measure and collect information regarding the operational performance or health of the asset. Exemplary information collected from sensors in a compressor 302 is illustrated in FIG. 3. The information may be related to: inlet temperature, inlet pressure, and bell mouth differential pressure (location 304); bearing temperature, seismic vibration data, and proximity (locations 306 and 310); discharge temperature and discharge pressure (location 308); pyrometer combustion dynamics and flame detection (location 312); wheel space temperature (location 314); and exhaust temperature and pressure (location 316). Other received data can include, but is not limited to, power output, compressor efficiency, turbine shaft speed, fuel flow, compressor inlet pressure drop, compressor exhaust pressure drop, ambient temperature, and ambient pressure.

Returning to FIG. 2, the sensed data can be received by the OSM data receiving module 218 in the form of time series. Each unit in an asset may be represented as a separate time series. The time series data can include information such as the unit frame and failure location of a piece of equipment, in one embodiment. For example, a time series can represent each of one or more channels of the turbine 104 shown in FIG. 1. Time series data can be received by the OSM data receiving module 218 at various frequencies, e.g., about 1 Hz. In an exemplary embodiment, OSM data may be collected at five-, ten-, or thirty-minute intervals over a two year period. In various other embodiments, OSM data can be represented in a form other than time series, may be transferred at different frequencies, and may be collected using different time intervals over different periods of time to, for example, capture seasonal variation in the OSM data.

The OSM data information extraction module 220 can preprocess data received from sensors associated with each unit in an asset, i.e., OSM data. In one embodiment, preprocessing the OSM data may include analyzing it for indications of asset damage or other anomalies. Preprocessing techniques can include, but are not limited to, data validation, outlier analysis, data filtration, data imputation, and statistical distribution analysis. Such techniques can be performed on the OSM data prior to the extraction of information from the OSM data, according to one embodiment.

The OSM data information extraction model 220 can also extract principal information from the OSM data and analyze the principal information to detect anomalies in an asset's performance or condition. The extracted information is principal in the way that it excludes certain information or data that may distort fault prediction. One or more signal processing techniques may be applied to extract the principal information from time series data, according to one embodiment. Such techniques can include, but are not limited to, visual inspection of time series plots, Bayesian wavelet de-noising, multi-resolution analysis through discrete wavelet packet transform, wavelet energy assessment of each decomposed signal, and classic Fourier spectra analysis. Extracting principal information from OSM data may be directed to conducting wavelet signal analysis to segregate noise, error, and incoherence information from the OSM data, i.e., de-noise the data. De-noising may be performed using discrete wavelet packet transform and/or Bayesian hypothesis testing, in some embodiments. In one embodiment, after a signal is de-noised, the de-noised signal can be decomposed into multi-resolution, time-frequency domains that include sets of wavelet coefficients. Wavelet packet component energy may be calculated for each set of wavelet coefficients to measure the signal energy content present in the frequency band at which the OSM is transferred, e.g., 1 Hz as noted above.

The extracted principal information from multiple sensors may be combined by the extracted information fusion module 222 shown in FIG. 2. In one embodiment, the information may be combined using Principal Component Analysis (PCA). PCA can be described as a multivariate statistical method that analyzes multivariate data simultaneously. PCA may consider uncertainty in sensor data and identify correlations between the sensor data as part of its analysis. For example, twenty input variables representing information from twenty sensors may be combined into two integrated principal information components representing a certain percentage of the information in the original sensor data, i.e., before the data was combined. The combination of the extracted principal information may be facilitated by the normalization of the sensor data to make it compatible for combining, in one embodiment. PCA may include various techniques, including, but not limited to, statistical factor analysis, matrix Eigenvalue decomposition, and maximum likelihood estimation. Various analysis methods other than PCA may be used in other embodiments.

The data modeling module 224 in FIG. 2 can analyze data to establish one or more prediction models for predicting faults in equipment. In one embodiment, the data that is analyzed can be the integrated principal components established by the extracted information fusion module 222. As noted above, such data can represent the behavior of equipment over time. Various types of prediction models can analyze the data, including one or a combination of a dynamical neural network with a stochastic activation function, wavelet function, fuzzy logic, or other statistical models. Another prediction model may include the combination of empirical data with physics-based transfer functions. Each of the prediction models may adapt for uncertainties and gaps in the sensor data. In one embodiment, the data modeling module 224 may update its data model used to predict faults each time additional integrated principal components are received.

The probability of a fault may be quantified by the fault probability quantification module 226. In one embodiment, Bayesian probabilistic assessment may be used to quantify the confidence or degree of certainty of the fault. For example, a fault on an asset can be predicted to occur with about 95% certainty.

The fault prediction module 228 can predict a fault based at least in part on the combined extracted information. In one embodiment, a user interface can display an identifier associated with an asset, the probability that a fault will occur in the asset, the amount of time remaining before the probable fault, and the unit or location in the asset at which the fault is probable. Providing such information can enable inspection and maintenance of equipment prior to a fault occurring. Fewer or more information may be displayed or reported in other embodiments to assist with fault prediction.

While the embodiment in FIG. 2 describes a computer device with a memory 202 including various modules, one will recognize that certain functionality associated with the computer device can be distributed to any number and combination of computer or processor-based devices in accordance with other embodiments. Various instructions, methods, and techniques described herein may be considered in the general context of computer-executable instructions, such as program modules, executed by one or more computers or other devices. Generally, program modules include routines, programs, objects, components, data structures, etc., for performing particular tasks or implementing particular abstract data types. These program modules and the like may be executed as native code or may be downloaded and executed, such as in a virtual machine or other just-in-time compilation execution environments. Typically, the functionality of the program modules may be combined or distributed as desired in various embodiments. An implementation of these modules and techniques may be stored on some form of computer-readable storage media.

Figure 4:
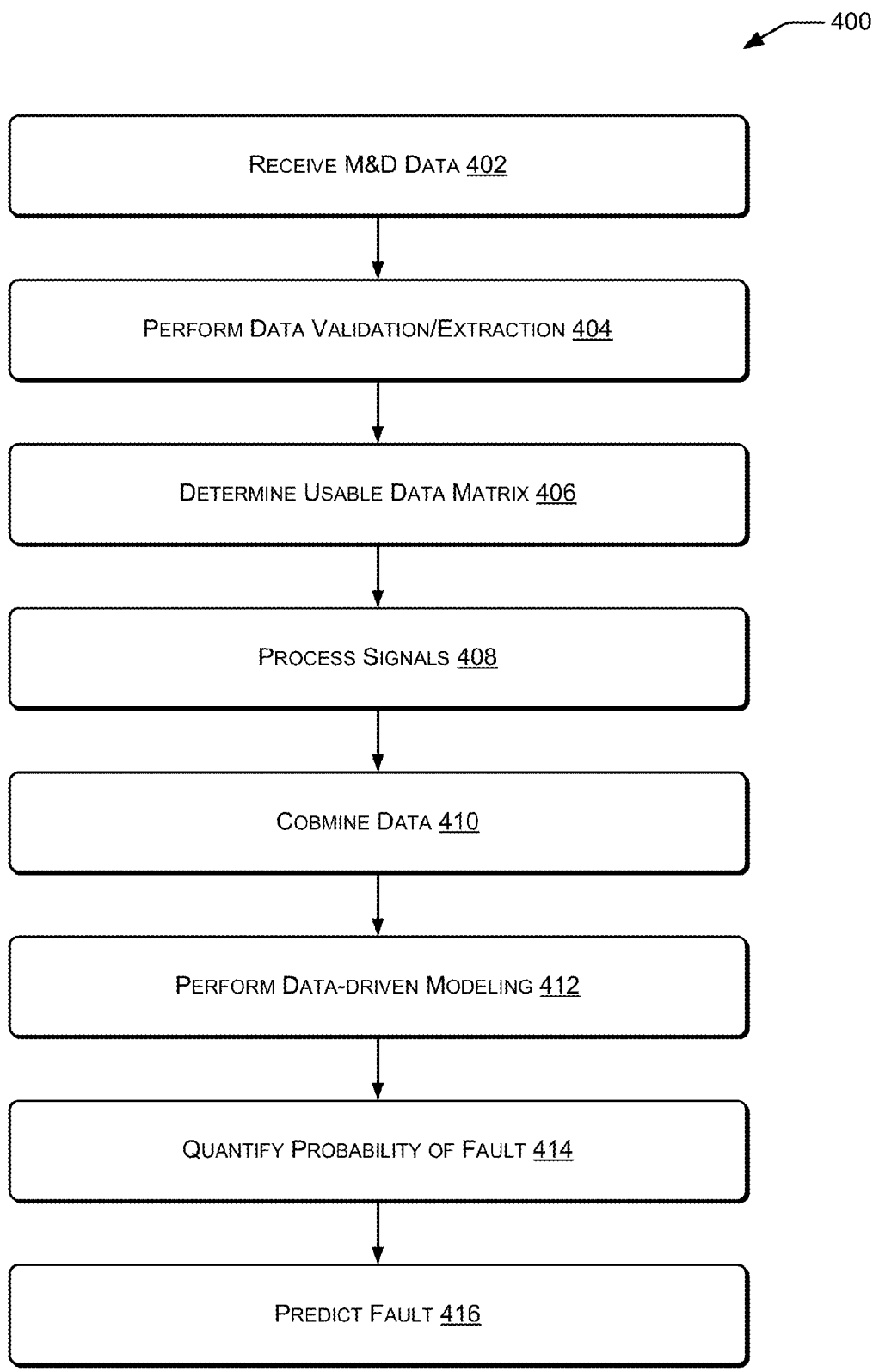
FIG. 4 is a flow diagram illustrating details of a method for performing fault prediction, according to one embodiment.

FIG. 4 is an exemplary flow diagram illustrating details of a method for predicting a fault in assets according to an embodiment of the invention. In one example, a computing device can perform any, some, or all of the operations of process 400. The process 400 is illustrated as a logical flow diagram, in which each operation represents a sequence of operations that can be implemented in hardware, software, or a combination thereof. In the context of software, the operations can represent computer-executable instructions stored on one or more computer-readable storage media that, when executed by one or more processors, perform the recited operations. Generally, computer-executable instructions can include routines, programs, objects, components, data structures, and the like that perform particular functions or implement particular abstract data types. The order in which the operations are described is not intended to be construed as a limitation, and any number of the described operations can be combined in any order and/or in parallel to implement the process.

In this particular implementation, the process 400 can begin at block 402, where data from one or more sensors associated with a monitored asset is received. In one embodiment, the data can be received by the OSM data receiving module 218 shown in FIG. 2. As noted above, the data can be in the form of time series responses for each set of sensor information. The data can be validated or preprocessed at block 404 using various graphical and statistical analysis techniques. The preprocessed data can be used to determine a usable data matrix at block 406. Determination of a usable data matrix may include excluding outliers or other unwanted data so that more reliable data can be extracted from the time series and used to predict faults. The time series data signals may be processed at block 408, where principal information can be extracted from the signals via one or more techniques implemented by the OSM data information extraction module 220, in one embodiment. The extracted principal information can be combined at block 410 such that input variables or responses from multiple sensors may be represented by fewer principal information components. Combining the data at block 410 can be implemented by the extracted information fusion module 222, in one embodiment.

Data-driven modeling can be performed at block 412. Such modeling may be data-driven in the way that the models may be updated as they receive new, combined extracted information. As noted above, one or more modeling techniques may be used to analyze the extracted information and may be implemented by the data modeling module 224, in one embodiment. The probability of a fault can be quantified at block 414 to determine the probability or likelihood that a fault will occur in an asset. A fault can be predicted at block 416 based at least in part on one or a combination of the analytical and statistical methods described above. Various information can be displayed or reported, e.g., via a fault prediction module 228, including an asset, the probability and location of a fault in an asset, and the time at which the fault is probable.

Illustrative systems and methods for fault prediction of monitored assets are described above. Some or all of these systems and methods may, but need not, be implemented at least partially by configurations such as those shown in FIGS. 1 and 2. It should be understood that certain acts in the methods may be rearranged, modified, and/or omitted entirely, depending on the circumstances. Also, any of the acts described above with respect to any method may be implemented by any number of processors or other computing devices based on instructions stored on one or more computer-readable storage media.

That which is claimed:

1. A system, comprising:
  at least one memory that stores computer-executable instructions;
  at least one processor configured to access the at least one memory, wherein the at least one processor is configured to execute the computer-executable instructions to:
    receive, from one or more sensors of an asset, on-site monitoring (OSM) data, the OSM data comprising time-series data associated with one or more respective units of the asset;
    remove a first respective portion of the time-series data associated with noise, wherein a second respective portion of the time-series data that is not removed comprises principal information for use in predicting a fault;
    extract the principal information from the time-series data;
    combine the extracted principal information; and
    predict the fault in the asset based at least in part on the combined principal information, wherein the prediction comprises determining a probability that the fault will occur at each of the one or more respective units for which time-series data was received.

2. The system of claim 1, wherein the at least one processor is further configured to execute the computer-executable instructions to perform at least one of data validation, outlier analysis, data filtration, data imputation, or statistical distribution analysis on the OSM data prior to the extraction of information from the OSM data.

3. The system of claim 1, wherein the at least one processor is further configured to execute the computer-executable instructions to establish a prediction model based at least in part on the combined principal information prior to the prediction of the fault.

4. The system of claim 3, wherein the prediction model comprises at least one of a dynamic neural network, a stochastic activation function, a wavelet approximation function, fuzzy logic, or a statistical model.

5. The system of claim 1, wherein the at least one processor is further configured to execute the computer-executable instructions to quantify the probability of fault of the asset prior to the prediction of the fault.

6. The system of claim 5, wherein the quantification comprises utilizing a Bayesian probabilistic assessment.

7. The system of claim 1, wherein the OSM data comprises at least one of compressor discharge temperature data, wheel space temperature data, compressor efficiency, compressor inlet pressure drop, compressor exhaust pressure drop, compressor inlet temperature, compressor inlet pressure, power output, seismic vibration, turbine shaft speed, fuel flow, ambient temperature, or ambient pressure.

8. The system of claim 1, wherein the extraction of information from the time-series data comprises at least one of Bayesian wavelet de-noising, multi-resolution analysis through discrete wavelet packet transform, wavelet energy assessment, or classic Fourier spectra analysis.

9. The system of claim 1, wherein the extraction of information from the time-series data comprises conducting wavelet signal analysis to segregate at least one of noise, error, or incoherence information followed by conducting discrete wavelet packet analysis to decompose the de-noised signal into multi-resolution, time-frequency domains.

10. A method, comprising:
  receiving, from one or more sensors of an asset, on-site monitoring (OSM) data, the OSM data comprising time-series data associated with one or more respective units of the asset;
  remove a first respective portion of the time-series data associated with noise, wherein a second respective portion of the time-series data that is not removed comprises principal information for use in predicting a fault;
  extracting the principal information from the time-series data;
  combining the extracted principal information; and
  predicting the fault in the asset based at least in part on the combined principal information, wherein the prediction comprises determining a probability that the fault will occur at each of the one or more respective units for which time-series data was received.

11. The method of claim 10, further comprising performing at least one of data validation, outlier analysis, data filtration, data imputation, or statistical distribution analysis on the time-series data prior to the extraction of information from the time-series data.

12. The method of claim 10, further comprising establishing a prediction model based at least in part on the combined principal information prior to the prediction of the fault.

13. The method of claim 12, wherein establishing the prediction model comprises employing at least one of a dynamic neural network, a stochastic activation function, a wavelet approximation function, fuzzy logic, or a statistical model.

14. The method of claim 10, further comprising quantifying the probability of fault of the asset prior to the prediction of the fault.

15. The method of claim 14, wherein quantifying the fault comprises utilizing a Bayesian probabilistic assessment.

16. The method of claim 10, wherein the OSM data comprises at least one of compressor discharge temperature data, wheel space temperature data, compressor efficiency, compressor inlet pressure drop, compressor exhaust pressure drop, compressor inlet temperature, compressor inlet pressure, power output, seismic vibration, turbine shaft speed, fuel flow, ambient temperature, or ambient pressure.

17. The method of claim 10, wherein extracting the information from the time-series data comprises employing at least one of Bayesian wavelet de-noising, multi-resolution analysis through discrete wavelet packet transform, wavelet energy assessment, or classic Fourier spectra analysis.

18. The method of claim 10, wherein extracting the principal information from the time-series data comprises conducting wavelet signal analysis to segregate at least one of the noise, error, or incoherence information followed by conducting discrete wavelet packet analysis to decompose the denoised signal into multi-resolution, time-frequency domains.

19. One or more computer-readable media storing computer-executable instructions that, when executed by at least one processor, configure the at least one processor to perform operations comprising:
receiving, from one or more sensors of an asset, on-site monitoring (OSM) data, the OSM data comprising time-series data associated with one or more respective units of the asset;
performing at least one of data validation, outlier analysis, data filtration, data imputation, or statistical distribution analysis on the time-series data, wherein the performing removes a first respective portion of the time-series data associated with noise, and wherein a second respective portion of the time-series data that is not removed comprises principal information for use in predicting a fault;
extracting the principal information from the time-series data;
combining the extracted principal information;
establishing a prediction model based at least in part on the combined principal information;
quantifying a probability of a fault of the asset occurring at each of the one or more respective units for which time-series data was received; and
predicting the fault in the asset based at least in part on the quantified probability of the fault.

20. The one or more computer-readable media of claim 19, wherein the asset comprises a gas turbine compressor.

* * * * *